US012730538B2

(12) United States Patent
Chen et al.

(10) Patent No.: US 12,730,538 B2
(45) Date of Patent: Sep. 8, 2026

(54) EXTERNALLY HANGED FLOATING TOUCH APPARATUS AND FLOATING TOUCH DISPLAY APPARATUS THEREOF

(71) Applicant: DARWIN PRECISIONS CORPORATION, Hsinchu County (TW)

(72) Inventors: Hsing-Yu Chen, Hsinchu County (TW); Chih-Hung Liu, Hsinchu County (TW); Ran-Shiou You, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/925,054

(22) Filed: Oct. 24, 2024

(65) Prior Publication Data

US 2025/0181194 A1 Jun. 5, 2025

(30) Foreign Application Priority Data

Nov. 30, 2023 (TW) ................................ 112146680

(51) Int. Cl.
*G06F 3/04886* (2022.01)
*G06F 3/042* (2006.01)

(52) U.S. Cl.
CPC ........ *G06F 3/0421* (2013.01); *G06F 3/04886* (2013.01); *G06F 2203/04108* (2013.01); *G06F 2203/04803* (2013.01)

(58) Field of Classification Search
CPC ............... G06F 3/0421; G06F 3/04886; G06F 2203/04108; G06F 2203/04803
See application file for complete search history.

(56) References Cited

U.S. PATENT DOCUMENTS 11,620,022 B1 * 4/2023 Huang .................. G02B 30/10 345/175
2011/0269543 A1 11/2011 Johnson
(Continued)

FOREIGN PATENT DOCUMENTS

CN 101403937 A 4/2009
CN 213780907 U 7/2021
(Continued)

*Primary Examiner* — Afroza Chowdhury

(57) ABSTRACT

The present invention provides an externally hanged floating touch apparatus, including a floating touch display module, a trigger module, and a connecting structure. The floating touch display module includes a floating touch unit, a display unit, and a receiver. The display unit is configured to generate an image, the floating touch unit is configured to generate a floating touch sensing area, and the floating touch sensing area corresponds to the image. A touch signal is suitable for being generated in the floating touch sensing area, and the receiver is configured to receive the touch signal from the floating touch sensing area. The trigger module is electrically connected to the floating touch display module. The trigger module includes a movable mechanism, and the touch signal is suitable for starting the movable mechanism. The connecting structure is suitable for connecting the externally hanged floating touch apparatus and an object.

8 Claims, 3 Drawing Sheets

(56) References Cited

U.S. PATENT DOCUMENTS

| | | | | |
|---|---|---|---|---|
| 2014/0268532 | A1* | 9/2014 | Nicol | G09F 15/0062 361/749 |
| 2016/0219270 | A1* | 7/2016 | Chen | G06F 3/0412 |
| 2017/0308173 | A1* | 10/2017 | Youn | G01V 8/20 |
| 2019/0141291 | A1* | 5/2019 | Mcnelley | H04N 9/3185 |
| 2019/0369805 | A1* | 12/2019 | Shi | G06F 3/0425 |
| 2020/0029451 | A1* | 1/2020 | Ran | H04M 1/0268 |
| 2020/0050322 | A1* | 2/2020 | Liu | G06F 3/042 |
| 2020/0213433 | A1* | 7/2020 | Griffith | G03H 1/02 |
| 2021/0357071 | A1* | 11/2021 | Chen | H10K 59/40 |
| 2022/0308693 | A1* | 9/2022 | Edo | G06F 3/042 |
| 2022/0335745 | A1* | 10/2022 | Lai | G06F 3/0436 |
| 2024/0036352 | A1* | 2/2024 | Hsu | G02B 30/27 |
| 2024/0184131 | A1* | 6/2024 | Jhang | G02B 27/30 |

FOREIGN PATENT DOCUMENTS

| | | | |
|---|---|---|---|
| CN | 113625901 | A | 11/2021 |
| CN | 115756208 | A | 3/2023 |
| JP | 2023526684 | A | 6/2023 |
| JP | 2023168064 | A | 11/2023 |
| TW | 201519030 | A | 5/2015 |
| TW | M616830 | U | 9/2021 |
| TW | I817737 | B | 10/2023 |

* cited by examiner

EXTERNALLY HANGED FLOATING TOUCH APPARATUS AND FLOATING TOUCH DISPLAY APPARATUS THEREOF

FIELD OF THE INVENTION

The present invention relates to a floating touch apparatus, and in particular to an externally hanged floating touch apparatus.

BACKGROUND OF THE INVENTION

A physical button or touch screen involves touch-based operation and thus is inevitably worn and damaged over long-term use. In addition, when the physical button or touch screen is used on a public device and touched by many people, it is likely to raise hygiene concerns, requiring regular cleaning. To reduce or avoid the foregoing defects, there is the floating touch apparatus for use. The floating touch apparatus may be mounted on the original device for the user to perform the floating operation, so as to achieve the original effect of pressing the button or touching the screen. However, the floating touch apparatus needs to be designed based on different devices, which brings about customization challenges. Furthermore, it covers the aesthetic interface of the original device screen, so there is room for improvement.

SUMMARY OF THE INVENTION

The present invention provides an externally hanged floating touch apparatus suitable for different devices or apparatus, can save the costs required for customization and keep the user interface and display screen of the original device or apparatus, and does not affect the functions of the user interface and display screen displaying information and creating visual aesthetics.

The externally hanged floating touch apparatus provided by the present invention includes a floating touch display module, a trigger module, and a connecting structure. The floating touch display module includes a floating touch unit, a display unit, and a receiver. The display unit is configured to generate an image, the floating touch unit is configured to generate a floating touch sensing area, and the floating touch sensing area corresponds to the image. A touch signal is suitable for being generated in the floating touch sensing area, and the receiver is configured to receive the touch signal from the floating touch sensing area. The trigger module is electrically connected to the floating touch display module. The trigger module includes a movable mechanism, and the touch signal is suitable for starting the movable mechanism. The connecting structure is suitable for connecting the externally hanged floating touch apparatus and an object.

The present invention further provides a floating touch display apparatus, including a display apparatus and the foregoing externally hanged floating touch apparatus. The display apparatus includes a display screen and a housing, where the display screen is disposed in the housing. The externally hanged floating touch apparatus is located on at least one side of the display apparatus, the connecting structure thereof connects the externally hanged floating touch apparatus and the display apparatus, and the movable mechanism corresponds to the display screen.

Because the connecting structure is used to connect the externally hanged floating touch apparatus and the object thereof, the present invention can reduce the interference of the externally hanged floating touch apparatus with the display function or visual aesthetics of the object.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

The foregoing and other technical contents and other features and advantages of the present invention will be clearly presented from the following detailed description of a preferred embodiment in cooperation with the accompanying drawings. Directional terms mentioned in the following examples, for example, upper, lower, left, right, front, back, top or bottom, are only used to describe directions referring to the attached drawings. Therefore, the directional terms used are for illustration and not for limitation. In addition, terms such as "first" and "second" involved in the description or claims are merely used for naming the elements or distinguishing different embodiments or ranges rather than limiting the upper limit or lower limit of the quantity of the elements.

The present invention provides an externally hanged floating touch apparatus which allows for non-contact operation by the user. The externally hanged floating touch apparatus of the present invention is further suitable for a touch device or a display apparatus. The touch device or the display apparatus may be, for example, a self-service machine such as a ticket dispenser or an automated teller machine. The self-service machine has a user interface that includes text, icons, layout, graphic design, and the like and is typically subjected to contact operation. When the device/apparatus is used with the externally hanged floating touch apparatus of the present invention, the user can perform floating operation to achieve the original effect of, for example, finger touching.

Figure 1:
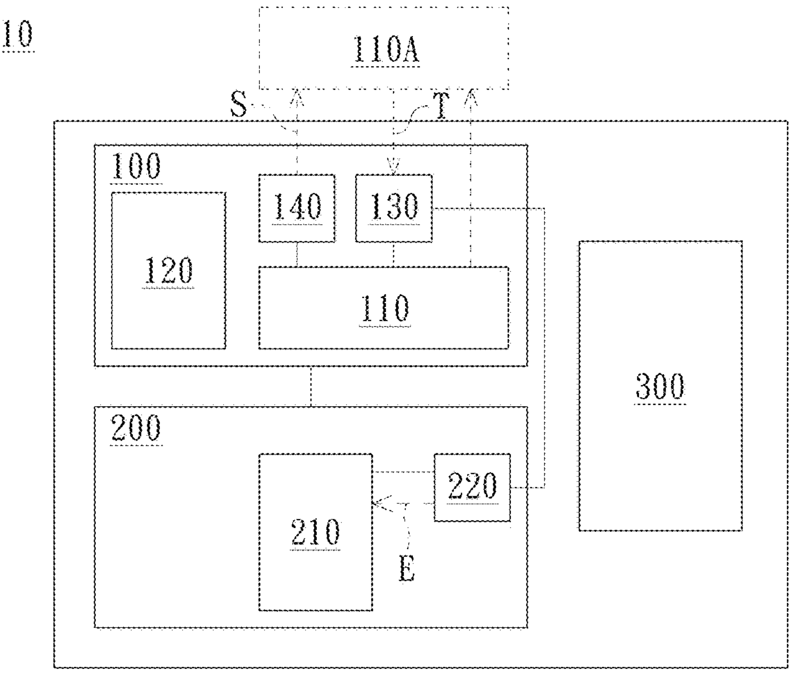
FIG. 1 is a schematic architecture diagram of an externally hanged floating touch apparatus according to an embodiment of the present invention.
Figure 2:
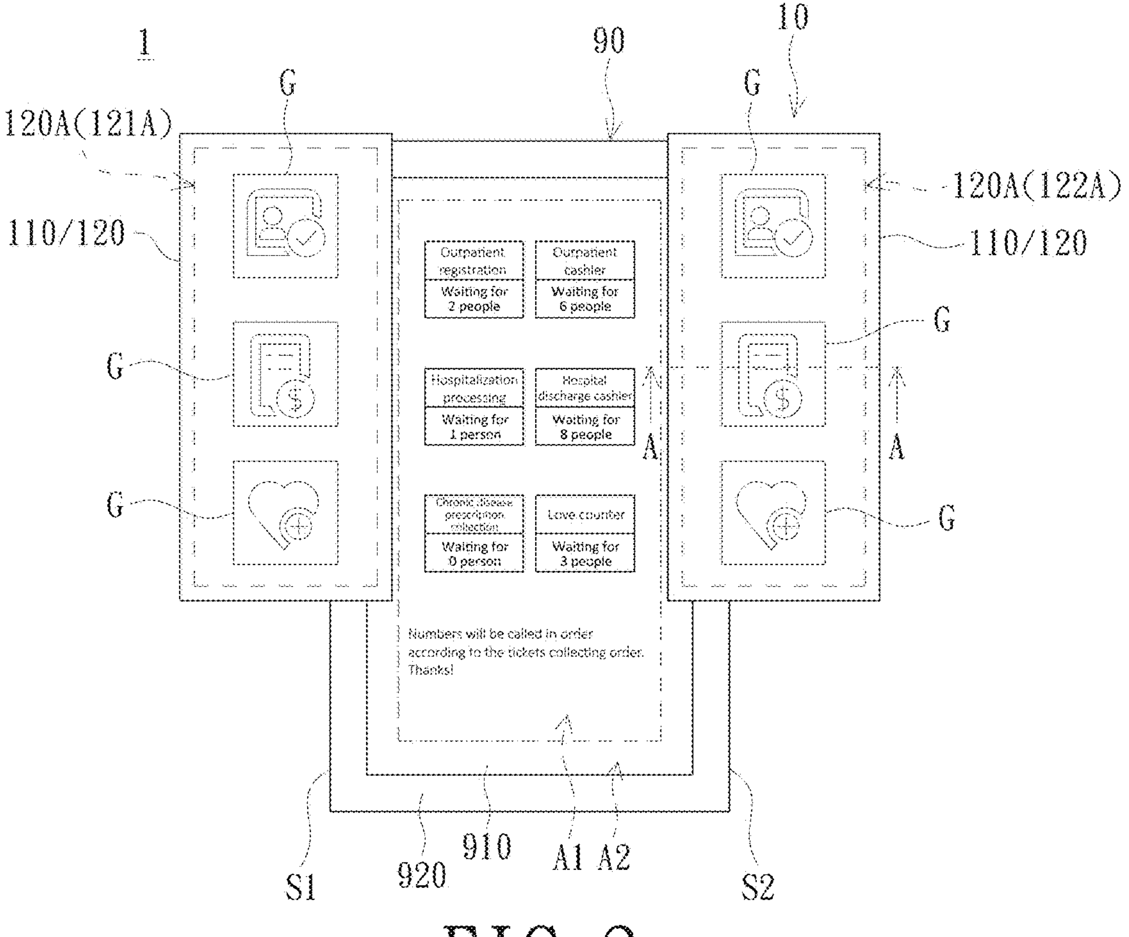
FIG. 2 is a schematic front view of an externally hanged floating touch apparatus according to an embodiment of the present invention.
Figures 3, 4:
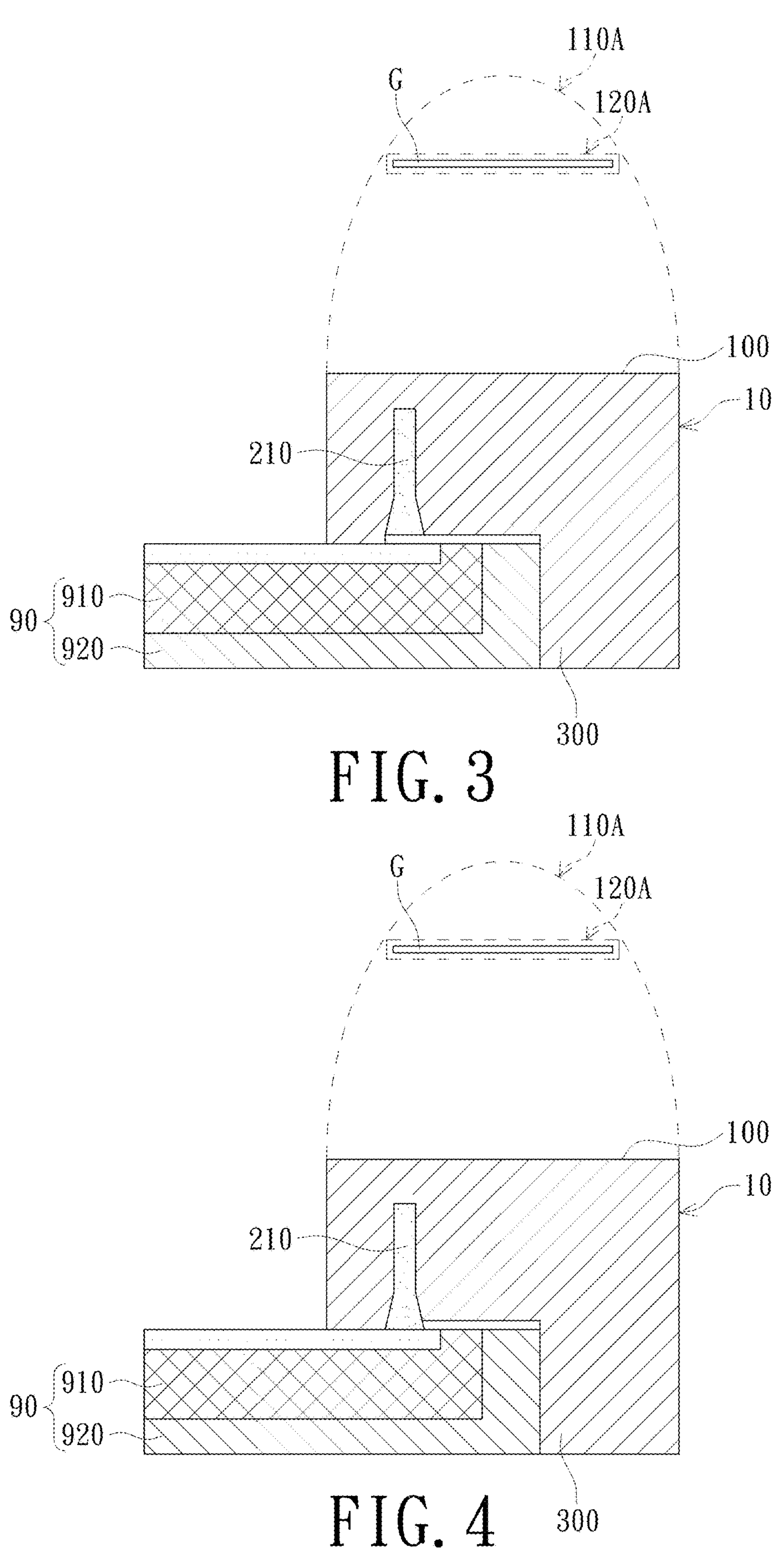
FIG. 3 is a schematic cross-sectional view along A-A according to the embodiment in FIG. 2.
FIG. 4 is another schematic cross-sectional view according to the embodiment in FIG. 2.

FIG. 1 is a schematic architecture diagram of an externally hanged floating touch apparatus according to an embodiment of the present invention, FIG. 2 is a schematic front view of an externally hanged floating touch apparatus according to an embodiment of the present invention, and FIG. 3 is a schematic cross-sectional view of FIG. 2. As shown in FIGS. 1 and 3, the externally hanged floating touch apparatus 10 includes a floating touch display module 100, a trigger module 200, and a connecting structure 300. The floating touch display module 100 includes a floating touch unit 110 and a receiver 130. The floating touch unit 110 is configured to generate a floating touch sensing area 110A, and a touch signal T is suitable for being generated in the floating touch sensing area 110A. The floating touch sensing area 110A is preferably located in a space in front of the externally hanged floating touch apparatus 10, where the term "in front of" typically refers to a side of the externally hanged floating touch apparatus 10 facing the user. The touch signal T can be generated when, for example, the user is involved with the floating touch sensing area 110A, and the receiver 130 is configured to receive the touch signal T from the floating touch sensing area 110A.

As shown in FIG. 2, the device/apparatus used with the externally hanged floating touch apparatus 10 itself can include a display screen 910, and the user can perform non-contact operation on the externally hanged floating touch apparatus 10 based on content shown by the display screen 910. The externally hanged floating touch apparatus 10 does not affect the display of the original device/apparatus. In other words, the externally hanged floating touch apparatus 10 is, preferably, not directly located in front of the display screen 910. In a preferred embodiment of the present invention, the floating touch display module 100 of the externally hanged floating touch apparatus 10 further includes a display unit 120 configured to generate an image G. The image G shown by the externally hanged floating touch apparatus 10 may be related to the content on the display screen 910 of the original device/apparatus and can preferably guide the user for operation in the floating touch sensing area 110A.

The floating touch sensing area 110A preferably corresponds to the image G. For example, the orientation of the image G and the orientation of the floating touch sensing area 110A are substantially the same, which facilitates identification and operation by the user. In several embodiments, the display unit 120 can generate a plurality of images G, and the floating touch unit 110 generates a plurality of floating touch sensing areas 110A to respectively correspond to the plurality of images G. As shown in FIG. 2, for example, the plurality of images G may be separately located on the left side and the right side, and the plurality of floating touch sensing areas 110A also are located on the left side and the right side respectively. In this embodiment, the images G on the left side and the right side each include three figures.

In several embodiments of the present invention, the display unit 120 includes a floating display device, and the image G generated by the floating display device is a floating image. The present invention does not limit the principle and structure of the floating display device and any display device capable of generating a floating image is within the spirit and scope of the present invention. In several embodiments, the floating display device may be composed of a collimating optical assembly, a light source assembly, an imaging unit, and a micro-lens array, but is not limited thereto.

The display unit 120 can be further used to generate an image display area 120A, and the image G can be located in the image display area 120A. The image display area 120A may be a physical area or a virtual area. For example, the image display area 120A may be a virtual area generated by the floating display device. In other embodiments, the display unit 120 may include, for example, a display panel, and the image display area 120A may be a physical area on the display panel. As shown in FIG. 3, the image display area 120A is preferably covered in the floating touch sensing area 110A. After identifying the image G in the image display area 120A, the user can operate in the light of the image G. Because the image G is preferably located in the floating touch sensing area 110A, the operation of the user can trigger a touch signal T in the floating touch sensing area 110A.

As shown in FIGS. 2 and 3, for example, the display unit 120 can generate image display areas 120A on the left and right sides, and the plurality of floating touch sensing areas 110A also located on the left and right sides respectively cover these image display areas 120A. The user can operate in different directions in the light of the image G, for example, on different orientations of the display screen 910 to trigger various touch signals T. It should be noted that the floating touch sensing area 110A will not be different only due to the orientations such as left and right sides. For example, even though the user operates on the left side of the display screen 910, a different touch signal T can be also triggered.

As shown in FIG. 1, the floating touch display module 100 further includes a sensor 140. The sensor 140 is configured to transmit a sensing signal S which is suitable for triggering the touch signal T in the floating touch sensing area 110A. In a preferred embodiment of the present invention, the sensor 140 can transmit the sensing signal S to the floating touch sensing area 110A, and a touch signal T is triggered via the sensing signal S when a person or an object is involved with the floating touch sensing area 110A. In several embodiments of the present invention, the sensor 140 may be, for example, an optical sensor or a laser sensor, and the sensing signal S is a beam of specific wavelength, such as infrared light. For example, the sensor 140 is an infrared sensor. The person or object in the floating touch sensing area 110A can interfere with the beam to generate, for example, reflected light. In this case, the reflected light can serve as the touch signal T. The receiver 130 may be, for example, an optical receiver or a laser receiver, receiving the reflected light and relaying the touch signal T to a downstream assembly. For example, the receiver 130 is an infrared receiver.

Further, as shown in FIG. 1, the trigger module 200 is electrically connected to the floating touch display module 100 and includes a movable mechanism 210. The touch signal T is suitable for starting the movable mechanism 210. In addition, in a preferred embodiment of the present invention, the touch signal T may be further converted into an electrical signal E for driving the movable mechanism 210. The movable mechanism 210 is suitable for acting on the foregoing device/apparatus and preferably acts on the display screen 910. In a preferred embodiment of the present invention, the movable mechanism 210 may be relatively behind the display unit 120.

The externally hanged floating touch apparatus 10 in this embodiment of the present invention may further include a controller 220, which is electrically connected to the receiver 130 of the floating touch display module 100 and configured to convert the touch signal T into the electrical signal E so as to drive the movable mechanism 210. As shown in FIGS. 1 and 3, the movable mechanism 210 preferably includes a retractable rod, and the electrical signal E can turn on a switch of the movable mechanism 210, such as a microswitch, and drive the rod to extend/retract. For example, the rod can be always kept in the retracted state shown in FIG. 3, and when the switch is turned on, the rod extends backwards as shown in FIG. 4 and touches the display screen 910 to achieve the original effect of, for example, finger touching.

The connecting structure 300 of the externally hanged floating touch apparatus 10 is suitable for connecting the externally hanged floating touch apparatus 10 and an external object, for example, the foregoing touch device or a display apparatus. Further, the externally hanged floating touch apparatus 10 is, preferably, disposed in a position other than the direct front position of the display screen 910 of the object via the connecting structure 300, which does not affect the display of the original device/apparatus. The user performs non-contact operation based on the content shown by the display screen 910, the image shown by the externally hanged floating touch apparatus 10, or both.

In several embodiments of the present invention, the externally hanged floating touch apparatus 10 is disposed, via the connecting structure 300, on the housing of the object and on a side of the display screen 910 thereof, and the movable mechanism 210 of the trigger module 200 is close to the display screen 910, such that when extending, the rod can touch the display screen 910. The connecting structure 300 may include, for example, a bracket assembly, which can be disposed on the housing of the object to fix the externally hanged floating touch apparatus 10 to the object.

Figure 5:
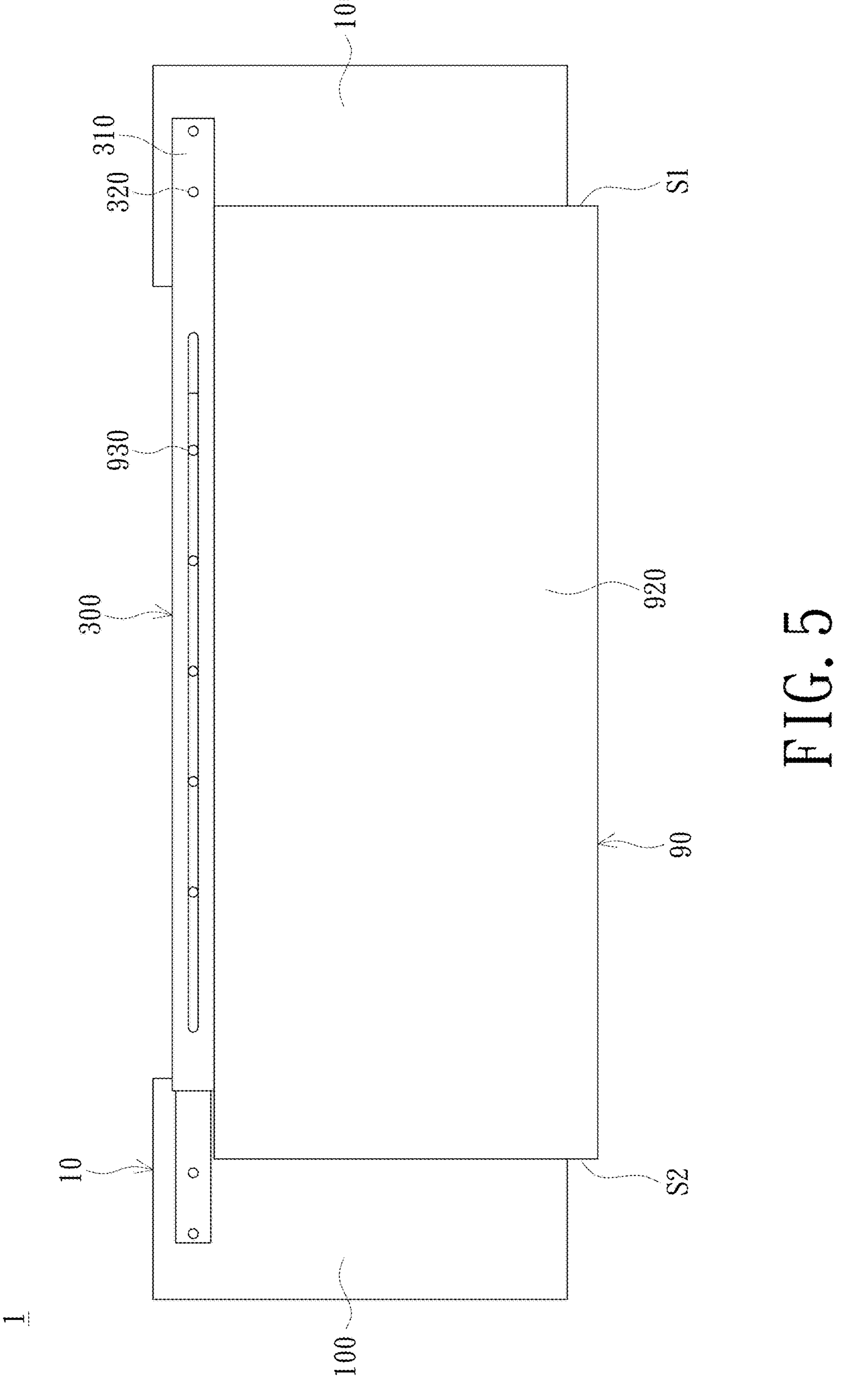
FIG. 5 is a schematic back view of an externally hanged floating touch apparatus according to an embodiment of the present invention.

FIG. 5 is a schematic back view of an externally hanged floating touch apparatus according to an embodiment of the present invention. As shown in FIGS. 2 and 5, the externally hanged floating touch apparatus 10 may include a plurality of display units 120 and a plurality of floating touch units 110. The display unit 120 and the floating touch unit 110 that are on the left side correspond to each other. In other words, the image display area 120A generated by the display unit 120 on the left side is covered by the floating touch sensing area 110A generated by the floating touch unit 110 on the left side. The display unit 120 and the floating touch unit 110 that are on the right side correspond to each other. The trigger module 200 includes a plurality of movable mechanisms 210 to separately correspond to the floating touch display modules 100 on the left and right sides, and the movable mechanisms 210 can operate due to the touch signal T. The connecting structure 300 may include a fixed rod 310. The floating touch display module 100 may be configured on the fixed rod 310, and the fixed rod 310 is disposed on the housing 920 from the back side of the object. In this embodiment, the floating touch display modules 100 are configured at two opposite ends of the fixed rod 310, and the display units 120 (the floating touch unit 110) are exposed on the left and right sides of the object. Preferably, the length of the fixed rod 310 can be adjusted to correspond to a different width of the object, so as to adjust the floating touch display modules 100 at two ends to be close to or adjoin the display screen 910, and the movable mechanism 210 is close to the display screen 910 for reaching the display screen 910. In this embodiment, the movable mechanisms 210 are preferably configured on inner sides of the floating touch display modules 100 at two ends. In sum, the externally hanged floating touch apparatus 10 does not shield the display screen 910 of the object, and the movable mechanism 210 is close enough to the display screen 910, thus allowing for touch on the display screen 910 from behind, to achieve the effect of, for example, finger touching.

The present invention further provides a floating touch apparatus including a display apparatus 90 and the foregoing externally hanged floating touch apparatus 10.

As shown in FIG. 2, the display apparatus 90 includes a display screen 910 and a housing 920, and the display screen 910 is disposed in the housing 920. The externally hanged floating touch apparatus 10 is connected to the display apparatus 90 via the connecting structure 300 and located on a side of the display apparatus 90. As shown in FIG. 5 again, further, the externally hanged floating touch apparatus 10 is disposed on the housing 920 via the connecting structure 300 and on a side of the display screen 910, and the movable mechanism 210 corresponds to the display screen 910.

The display apparatus 90 may have a first side S1 and a second side S2 opposite to the first side S1. In a preferred embodiment of the present invention, the first side S1 and the second side S2 are the left side and the right side of the display apparatus 90. As shown in FIGS. 2 and 5, in several embodiments of the present invention, the display unit 120 of the externally hanged floating touch apparatus 10 may include a plurality of floating display devices. In addition, the externally hanged floating touch apparatus 10 is disposed on the housing 920 from the back side of the display apparatus 90, and the floating display devices of the display unit 120 are exposed on the first side S1 and the second side S2, and close to or adjoin the display screen 910. In other embodiments, the floating touch display module 100 or the display unit 120 may alternatively be on only the first side S1 or the second side S2.

As shown in FIGS. 2 and 5, the connecting structure 300 further includes a plurality of fixing members 320 adapted to the fixed rod 310. The plurality of floating display devices of the display unit 120 such as two floating display devices may be located at two opposite ends of the fixed rod 310. In addition, the back side of the housing 920 of the display apparatus 90 may be provided with a plurality of fixed portions 930 adapted to the plurality of fixing members 320. The fixing member 320 may be, for example, a screw, the fixed portion 930 may be provided with, for example, a thread hole, and the plurality of fixing members 320 match the plurality of fixed portions 930, such that the fixed rod 910 is disposed on the housing 920.

As shown in FIGS. 2 and 3, the image display area 120A of the display unit 120 is located on a side of the display apparatus 90. In this embodiment, because the display unit 120 may include two floating display devices, it can have a first image display area 121A and a second image display area 122A which are respectively on the first side S1 and the second side S2. It can be known that the floating touch unit 110 may also generate a plurality of floating touch sensing areas 110A separately covering the first image display area 121A and the second image display area 122A.

As shown in FIGS. 2 and 3, in an embodiment of the present invention, the display screen 910 of the display apparatus 90 may include a first area A1 and a second area A2 surrounding the first area A1. The externally hanged floating touch apparatus 10 does not shield the display screen 910 and at least does not shield the first area A1 of the display screen 910. The rod of the movable mechanism 210 corresponds to the second area A2 and can reach the display screen 910 to cause a touch effect. The preferable width of the second area A2 is not greater than 2 centimeters.

As shown in FIG. 2, the display apparatus 90 may be, for example, a ticket dispenser in a hospital, but is not limited thereto in the present invention. The display screen 910 of the display apparatus 90 has a touch area for touch operation by the user. The user can touch a corresponding area on the display screen 910 based on the content on the display screen 910 such as registration, cashier, and hospitalization, etc. The touch result may be that, for example, the display apparatus 90 prints a number ticket for a to-do item such as registration, cashier, and hospitalization, etc. When the display apparatus 90 is equipped with the externally hanged floating touch apparatus 10, the externally hanged floating touch apparatus 10 can provide a non-contact operating interface, allowing the user to obtain the number ticket without touching the display screen 910. Moreover, the user can also obtain complete information such as the number of people waiting for each to-do item from the content displayed on the display screen 910 for operation. In addition, the externally hanged floating touch apparatus 10 can show the image G, and the image G displayed by the externally hanged floating touch apparatus 10 may be related to the content on the display screen 910, for example, a figure corresponding to the content, which is conducive to guiding the user to operate in the floating touch sensing area 110A.

In sum, the present invention provides an externally hanged floating touch apparatus suitable for different devices or apparatus, can save the costs required for customization of different devices/apparatuses and keep the display screens 910 and/or user interfaces of the original devices or apparatuses, and does not affect the functions of the display screen 910 and the user interface displaying information and creating visual aesthetics.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A floating touch display apparatus, comprising:

a display apparatus comprising a display screen and a housing, wherein the display screen is disposed in the housing; wherein the display apparatus has a first side and a second side opposite the first side; and an externally hanged floating touch apparatus located on the first side, the second side, or both sides of the display apparatus, comprising:

a floating touch display module comprising a floating touch unit and a receiver, wherein the floating touch unit is configured to generate a floating touch sensing area, a touch signal is suitable for being generated in the floating touch sensing area, and the receiver is configured to receive the touch signal from the floating touch sensing area;

a trigger module electrically connected to the floating touch display module, wherein the trigger module comprises a movable mechanism, and the touch signal is suitable for starting the movable mechanism; and a connecting structure connecting the externally hanged floating touch apparatus and the display apparatus, wherein the externally hanged floating touch apparatus is located on at least one side of the display apparatus, and the movable mechanism corresponds to the display screen;

wherein the display screen of the display apparatus further comprises a first area and a second area surrounding the first area, and the movable mechanism comprises a retractable rod corresponding to the second area of the display screen.

2. The floating touch display apparatus according to claim 1, wherein the floating touch display module further comprises a display unit, the display unit is configured to generate an image, and the floating touch sensing area corresponds to the image.

3. The floating touch apparatus according to claim 2, wherein the display unit comprises a floating display device, the floating display device is configured to generate the image, and the image is a floating image.

4. The floating touch apparatus according to claim 2, wherein the display unit is further configured to generate an image display area, the image display area is located on the first side, the second side, or both sides of the display apparatus, the image is located in the image display area, and the floating touch sensing area covers the image display area.

5. The floating touch apparatus according to claim 2, wherein the display unit comprises at least two floating display devices, the at least two floating display devices respectively have a first image display area and a second image display area, and the first image display area and the second image display area are respectively located on the first side and the second side of the display apparatus; and the connecting structure comprises a fixed rod, and the at least two floating display devices are located at two opposite ends of the fixed rod.

6. The floating touch apparatus according to claim 1, wherein the floating touch display module further comprises a sensor, the sensor is configured to emit a sensing signal, and the sensing signal is suitable for triggering the touch signal in the floating touch sensing area.

7. The floating touch apparatus according to claim 1, wherein the externally hanged floating touch apparatus further comprises a controller, the controller is electrically connected to the receiver of the floating touch display module and configured to convert the touch signal into an electrical signal, and the electrical signal is used for driving the movable mechanism.

8. The floating touch apparatus according to claim 1, wherein the connecting structure comprises a fixed rod and a plurality of fixing members, and the plurality of fixing members are adapted to the fixed rod; and the housing of the display apparatus is provided with a plurality of fixed portions adapted to the fixing members on an opposite side of the display screen, the fixing members are assembled with the fixed portions, and the fixed rod is disposed on the housing.

* * * * *